United States Patent Office 3,327,305
Patented June 20, 1967

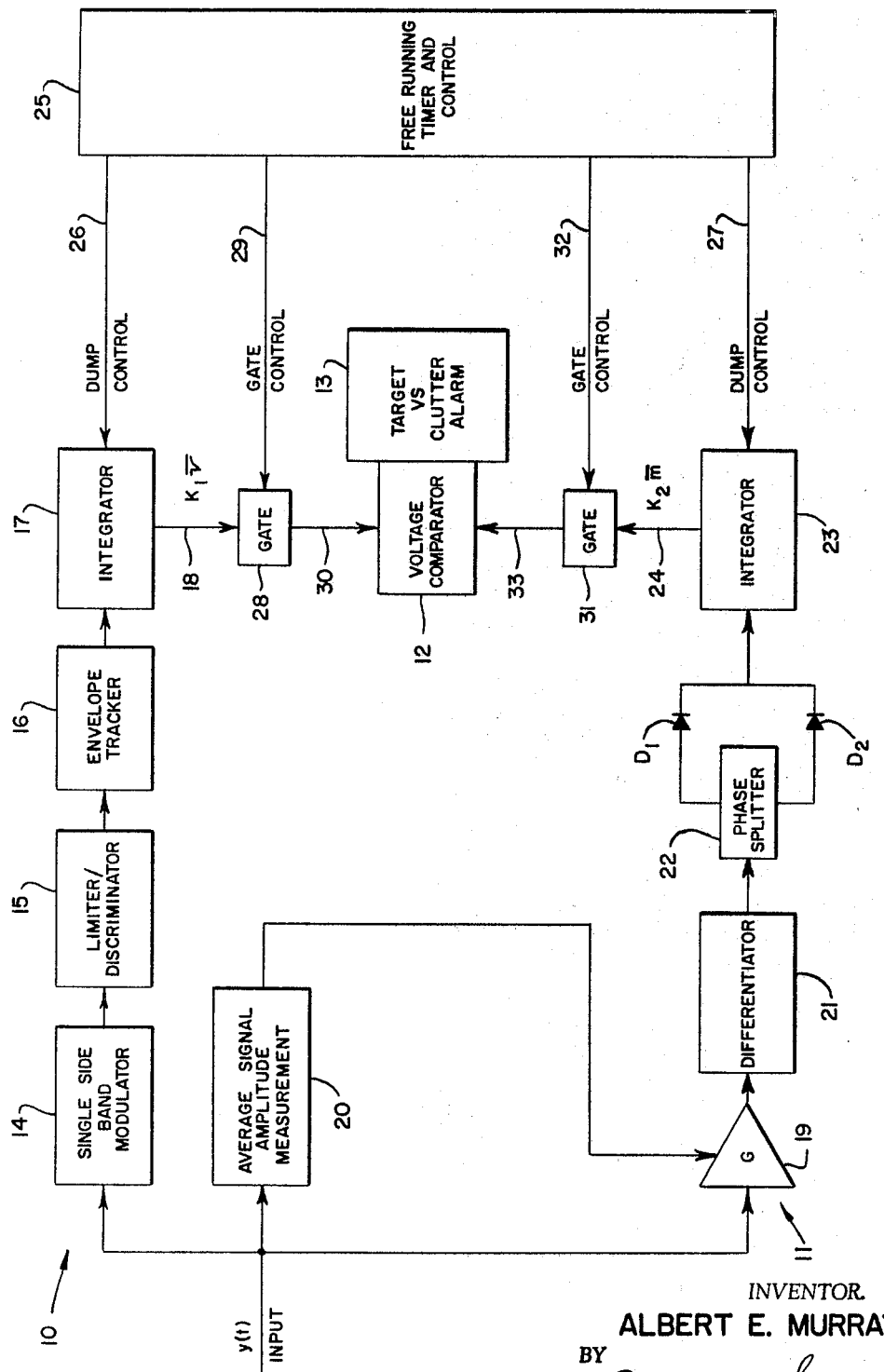

3,327,305
APPARATUS FOR ANALYSING AN AUDIO SIGNAL
Albert E. Murray, Bedford, Mass., assignor to Cornell Aeronautical Laboratory, Inc., Buffalo, N.Y., a corporation of New York
Filed May 11, 1965, Ser. No. 454,846
3 Claims. (Cl. 343—5)

This invention relates to apparatus for analysing an audio signal, and more particularly to means for analysing a Doppler radar audio output signal in order to detect a moving target.

While the present invention has utility in applications involving the classification of audio signals, such as for speech recognition and hydrophone signal recognition besides others, it is particularly useful in radar surveillance applications.

With Doppler radar surveillance, the problem is to distinguish between moving objects of no interest such as moving foliage and moving targets of military interest such as vehicles or pedestrians. The present invention is adapted to make this distinction.

Accordingly, the primary object of the present invention is to provide apparatus which, when fed an audio signal such as from a Doppler radar, will render a correct decision on the presence or absence of certain qualities in each small fraction of a second of the signal.

The aforesaid qualities are:
(1) a measure of frequency determined by averaging over a short period of time, called $\bar{\nu}$, as defined by a limiter-discriminator and smoothing network;
(2) a different measure of average frequency, called $\bar{m}$, corresponding to the time rate of change of envelope "Variation" of the audio waveform normalized by average signal level, wherein the "Variation" $V(b)$ of a signal $y(t)$ over same interval $(b)$ of its existence may be defined by $$V(b) \int b \left| \frac{dy}{dt} \right| dt$$

and is proportional to the total vertical distance, both up and down, that an oscilloscope spot would travel in tracing this signal, and without changing its essential meaning "Variation" can be more conveniently defined or measured by a network containing an amplifier, a differentiator, a phase splitter, two diodes and an integrator, all as to be described infra;
(3) a comparison of the measured values of $\bar{\nu}$ and $\bar{m}$; and
(4) a test of whether $\bar{m}$ is or is not greater than $\bar{\nu}$ by a predetermined amount, $\theta$.

The steps outlined in (1) through (4) above are equivalent to a test of whether $\bar{m}/\bar{\nu} \leq \theta$, i.e. whether the ratio of $\bar{m}$ to $\bar{\nu}$ is no greater than $\theta$.

It has been found by experiment with audio output signals of Doppler radars that one range of values for $\bar{m}/\bar{\nu}$ tends strongly to be associated with moving radar targets of military interest, including vehicles or pedestrians, while a different range of values is associated with returns from ensembles containing no moving targets other than moving foliage and also associated with receiver noise such as occurs when reflected returns cause little or no quieting through automatic gain control action. Consequently, a device for performing the test $$\frac{\bar{m}}{\bar{\nu}} \leq \theta$$

can be used for estimating whether a moving military target is reflecting a signal to the radar. Since the test can be performed in a fraction of a second, it can render a useful decision on every point of an area surveyed by a sweeping and scanning radar whose effective dwell time on each point in the area is equal to or greater than the aforesaid fraction of a second.

The best choice of value for the test threshold, $\theta$, depends on the use to which the measurements system is to be applied. When $\bar{m}$ and $\bar{\nu}$ are expressed in the same units, $\bar{m}/\bar{\nu}$ is usually $\leq 2.0$ if a moving target such as a vehicle or a man is in the range gate, while $\bar{m}/\bar{\nu}$ is usually $> 2.0$ when no moving object or when only moving foliage or when no reflector is within the range gate. When both target and foliage are present, the effect of the target will override the effect of the foliage if the ratio of the target signal to the foliage signal is sufficiently great. This sufficiency is determined by characteristics of the radar and the reflecting objects and not by characteristics of the $\bar{m}/\bar{\nu}$ measuring device.

The circuitry for automatic detection can be realized in a number of alternative ways so long as it performs the equivalent of measuring $\bar{m}/\bar{\nu}$ and triggers an alarm when this quantity drops below a threshold of $\theta > 2.0$ and when $\bar{m}$ and $\bar{\nu}$ are expressed in the same units.

The accompanying drawing shows a suitable schematic diagram of a target detector which tests for $$\frac{\bar{m}}{\bar{\nu}} \leq 2.0$$

for each successive fraction of a second of signal.

The device shown in the drawing comprises two sub-circuits or channels designated generally 10 and 11, the former to measure $\bar{\nu}$ and the latter to measure $\bar{m}$, both of which feed their outputs to a comparator 12. Whenever the output of $\bar{m}$ fails to exceed $2\bar{\nu}$ at the sampling time, i.e. the end of a predetermined unit of time, the comparator 12 triggers a target alarm 13. Such alarm 13 may be of any suitable type and construction and may, for example, be used to stop the radar sweep as well as to alert the operator by a sound or sight signal. If desired, a device (not shown) controlling the sweep and scan of a surveillance Doppler radar may be made to respond to the $$\frac{\bar{m}}{\bar{\nu}} \geq 2$$

target alarm by interrupting its normal continuous systematic sweep and scan program in order to dwell for a few seconds on the target so as to furnish a long signal sample to some further kind of target classification processing.

A Doppler radar output signal designated as $y(t)$ is fed to each of the sub-circuits 10 and 11. Such signal $y(t)$ is an audio signal whose frequency and amplitude fluctuations contains target motion information and is produced by any suitable type of radar equipment, such as a pulsed non-coherent surveillance radar (not shown). Any type of conventional radar echo signal containing amplitude and frequency information could serve as an input signal.

The sub-circuit 10 for measuring $\bar{\nu}$ translates the audio signal $y(t)$ to a higher frequency interval, say around 20 kc., removes one sideband produced by this translation and also removes the translating carrier, limits or clips the translated signal to remove amplitude fluctuations, and measures the average frequency of the translated, limited signal.

More specifically, sub-circuit 10 is shown as including a single side band modulator 14, a limiter/discriminator 15, an envelope tracker or detector 16 and an integrator 17. Modulator 14 functions to increase the frequency of all components of the audio signal $y(t)$ while keeping its band width the same.

The limiter/discriminator 15 removes the amplitude modulation of an input signal and converts its frequency modulation into a new amplitude modulation. The limiter of means 15 functions to produce constant amplitude pulses corresponding to those intervals of input signal which have risen above an upper threshold and have not yet fallen below a lower threshold. For a bipolar input signal, the threshold signals should be placed close to the baseline of the signal, say on the order of 1/10 or less than the average signal peak amplitude. If, for example, the average signal peak amplitude is amplified to correspond to 30–50 volts, the thresholds can easily be set to about 1 volt. In this manner the thresholds are placed in such a position with respect to the no-signal voltage level that the average rate at which the signal crosses the thresholds approximates what is generally known as the "zero-crossing rate." The output of the limiter of means 15 is a constant amplitude signal having frequency fluctuations which will produce from the discriminator of means 15 an output signal having amplitude fluctuations proportional to the limited signal's frequency fluctuations.

Envelope tracker or detector 16 is a signal transmission means, such as a smoothing network having a suitable time constant, that produces a running indication of the envelope or average amplitude of the output signal from the discriminator of means 15. This envelope is a measure of signal frequency average over a short time. Hence, for the type of discriminator whose gain is proportional to frequency, a means 16 is needed to track or detect just the envelope of the discriminator output signal, ignoring the actual high speed oscillations of the waveform. Such an envelope tracker or detector 16 then acts as an indicator of short time average frequency of the limited signal. In order to have the means 16 follow or detect only the envelope, the agility of the means 16 must be balanced against a sluggishness which prevents the means from following the actual signal oscillations. Thus, a smoothing network having a time constant suitably chosen for this job, according to common practice, may be selected.

Since further averaging is wanted, the integrator 17 averages the envelope signal over a longer time, i.e. over the whole interval $b$ which will be referred to later herein. Such an integrator may be an accumulator with virtually no resistance to build-up and having infinite decay time, or it may be an RC smoothing network with a longer time constant than the envelope tracker or detector.

An output line 18 from integrator 17 carries a voltage $K_1 \bar{v}$ which is proportional to the zero-crossing frequency of the audio signal averaged over a limited number of cycles, i.e., over a short time. $K_1$ is a constant of proportionality, determined by the arbitrary units of voltage which may be used to represent frequency.

The sub-circuit 11 for measuring $\bar{m}$ is shown as comprising an amplifier 19 with automatic gain control including means 20 for measuring average signal amplitude, a differentiator 21, a phase splitter 22, diodes $D_1$ and $D_2$, and an integrator 23.

Amplifier 19 with automatic gain control standardizes the average audio signal level. Differentiator 21 operates to take the derivative $(dy/dt)$ of the amplified signal. The phase splitter 22 converts the input signal into two signals, one positive, and one negative. Diodes $D_1$ and $D_2$, or suitable equivalents, block one of these signals and pass the other to integrator 23. In other words, the phase splitter 22 and two diodes $D_1$ and $D_2$ are arranged in such a way as to send a positive signal out no matter what polarity of signal in. The logical effect of the complex of phase splitter 22 and diodes $D_1$ and $D_2$ is to pass to integrator 23 the absolute value of the derivative $(dy/dt)$. Integrator 23 is shown as having an output line 24 for carrying a voltage $K_2\bar{m}$ which is proportional to $\bar{m}$, $k_2$ being a constant. $K_1$ and $K_2$ may be adjusted to make $K_2\bar{m}/K_1\bar{v}=1$ for any constant frequency sine wave test signal at the input.

The quantity $\bar{m}$ is the Variation per unit of time so that the total Variation over some time $b$, expressed as $V(b)$, is $V(b)=\bar{m}.b$. $V(b)$ is proportional to $\bar{m}$, and the proportionality multiplier is the time, $b$, over which $V(b)$ is measured, the proportionality is known. In general, $b$ will be a fixed, settable constant, equal to the effective dwell time of the radar on a fixed, point target, when operated in an automatic sweep mode, and $\bar{m}$ will be the total envelop Variation $V(b)$ of the audio signal measured over this dwell time. If the signal to be measured is $y(t)$, the envelope Variation of this signal over the time interval $b$ may be calculated as the sum of all the chanegs in the instantaneous numerical value of $y(t)$ which occur during the interval $b$, provided that all changes are considered as positive, regardless of their direction. More concisely, this means that $V(b)$ may be measured as $$V(b) = \int_b |dy/dt| dt$$

and the measurement may be implemented with an integrating amplifier such as 23 to which is fed the absolute value of the output of a differentiating amplifier such as 21 through the phase splitter 22 and diodes $D_1$ and $D_2$.

Suitable switching circuitry represented generally at 25 dumps the old value of V and allows the new value of V to accumulate over precisely the period $b$. A dump control line 26 associates circuitry 25 with integrator 17. A similar dump control line 27 associates circuitry with integrator 23.

The same circuitry 25 also activates the comparison between suitably scaled measures of $V(b)$ and $\bar{v}$ at the end of each $b$ interval. Thus a gate 28 is provided to which integrator output line 18 is connected as is also a gate control line 29 from circuitry 25. A gate output line 30 leads from gate 28 to comparator 12. Also, a gate 31 is connected to integrator output line 24 and to a gate control line 32 from circuitry 25. A gate output line 33 leads from gate 31 to comparator 12. Gates 28 and 31 are normally closed but open when a pulse is fed through gate control lines 29 and 32 at the end of $b$ seconds.

Circuitry 25 comprises a free running time and suitable dump and gate control means. It enables a comparison of $k_1 \bar{v}$ and $k_2 \bar{m}$ every $b$ seconds and clears the integrators 17 and 23 at the end of such time for recycling. Typically $b$ or dwell time is 0.5 second. The decay time constant of the average signal amplitude measuring means 20 is much greater than the value of $b$.

The specific construction of the various means 10, 11, 12, 13 and 25 and their alternatives will be apparent to those skilled in the art and hence are not illustrated in detail. The scope of the invention is to be measured by the appended claims.

What is claimed is:

1. In apparatus for analysing certain frequency and amplitude parameters of an input audio signal, the combination comprising first means for producing a first signal that is proportional to the zero-crossing frequency, averaged over a short period of time, of said input signal, said first means including means for producing a second signal that is proportional to the integral of said first signal, second means for integrating the absolute value of the derivative of the amplitude of said input signal, and third means for comparing the outputs of said first and second means.

2. Apparatus according to claim 1 wherein said third means includes means for activating an alarm when the ratio of said outputs of said first and second means falls below a predetermined value.

3. Apparatus according to claim 1 wherein said first means includes a modulator, a limiter-discriminator, an envelope tracker and an integrator, said second means includes an amplifier, a differentiator, a phase splitter and an integrator, and said third means includes a voltage comparator.

References Cited

UNITED STATES PATENTS 2,659,078  11/1953  Sherr _____ 343—7.7

RODNEY D. BENNETT, *Primary Examiner.*

CHESTER L. JUSTUS, *Examiner.*

R. A. FARLEY, *Assistant Examiner.*